US006359346B1

(12) United States Patent
Kumar

(10) Patent No.: US 6,359,346 B1
(45) Date of Patent: Mar. 19, 2002

(54) PROCESSOR AND METHOD FOR ACCOMMODATING FAILED SPEED SENSORS IN A LOCOMOTIVE

(75) Inventor: Ajith Kuttannair Kumar, Erie, PA (US)

(73) Assignee: General Electric Company

(*) Notice: Subject to any disclaimer, the term of this patent is extended or adjusted under 35 U.S.C. 154(b) by 51 days.

(21) Appl. No.: 09/644,918

(22) Filed: Aug. 23, 2000

(51) Int. Cl.[7] ............................................... H02P 9/00
(52) U.S. Cl. ...................... 290/40 A; 318/490; 322/37
(58) Field of Search ................... 290/40 R, 40 A, 290/40 B, 40 C; 318/34, 490; 322/17, 37

(56) References Cited

U.S. PATENT DOCUMENTS

| 4,200,832 A | * | 4/1980 | Johansson | 322/59 |
| 5,168,416 A | * | 12/1992 | Bailey et al. | 361/31 |
| 5,629,567 A | | 5/1997 | Kumar | 290/3 |
| 5,892,342 A | * | 4/1999 | Friedlander et al. | 318/434 |
| 5,990,648 A | | 11/1999 | Kumar et al. | 318/490 |
| 5,992,950 A | * | 11/1999 | Kumar et al. | 303/151 |
| 6,104,148 A | | 8/2000 | Kumar et al. | 318/52 |
| 6,163,121 A | * | 12/2000 | Kumar et al. | 318/434 |
| 6,118,466 A1 | * | 2/2001 | Becker et al. | 322/25 |
| 6,199,023 B1 | * | 3/2001 | Kliman | 702/67 |

* cited by examiner

*Primary Examiner*—Nicholas Ponomarenko
(74) *Attorney, Agent, or Firm*—Carl A. Rowold; Enrique A. Mora; Beusse, Brownlee, Bowdoin & Wolter, P.A.

(57) ABSTRACT

Method and processor for accommodating speed sensor faults in a locomotive are provided. The method allows for providing predefined operational functions in the locomotive. The functions may be based on one or more speed sensor signals from a plurality of speed sensors in the locomotive. The method further allows for continuing to provide the operational functions even in the presence of faults in some of the speed sensors.

18 Claims, 2 Drawing Sheets

PROCESSOR AND METHOD FOR ACCOMMODATING FAILED SPEED SENSORS IN A LOCOMOTIVE

BACKGROUND OF THE INVENTION

The present invention is generally related to operation of vehicles, such as locomotives, in the presence of faults in sensors used by the vehicle and, more particularly, the present invention is related a processor and method for accommodating failed speed sensors in the vehicle.

On vehicles propelled by traction motors, such as locomotives, transit vehicles, electric or hybrid buses, etc., each axle driven by one or more traction motors may have a respective speed sensor coupled thereto for providing control of the vehicle propulsion during various modes of operation of the vehicle, such as during motoring and braking. Typically, in a locomotive, the speed sensors may also be used for providing various operational functions, such as locked-axle detection, torque production, slow speed control, speedometer, cab signaling equipment, event recorder, etc. It will be appreciated that some of these functions, such as locked-axle detection may require speed sensor information from each axle. For other functions, speed sensor information from one axle or some times from two axles may be sufficient.

One known implementation, as shown in FIG. 1, allows for selecting speed sensor information from one predefined single axle, e.g., axle two, and using this speed sensor information for controlling functions like speedometer, event recorder, cab signaling, etc. By way of example, two such functions that require speed sensor information, Function 1 and Function 2, are represented in FIG. 1. One of such functions, Function 1, uses information from one speed sensor and the other function, Function 2, e.g., a function potentially affecting safety issues, may use inputs from multiple sensors, e.g., two or more distinct speed sensor inputs. As shown in FIG. 1, the same speed sensor input may be used for multiple functions, however, in the implementation of FIG. 1 there are speed sensors which are not used, e.g., speed sensors 1, 3, 4 and 6. Thus, in this example, a fault of a single speed sensor, e.g., speed sensor 2, could disable Functions 1 and 2.

When speed sensors on any axle fail, functions like torque production and locked-axle detection could be performed using other information, that is, information other than speed sensor information, especially on AC locomotives. Thus, respective known techniques may allow for providing torque production, or locked axle detection, or both, without speed sensor information. However, when speed sensor information from the predefined single axle is faulty, respective functions, such as those represented in FIG. 1, that do not rely on speed sensor information from other axles, like speedometer, event recorder, cab signaling, etc., would also fail. This type of failure may be costly and time consuming since it causes locomotives to be inoperative.

Thus, there is a need for avoiding the foregoing drawbacks so that the locomotive may continue to operate even when some of the speed sensors fail, at least until the failed speed sensor may be repaired and/or replaced at an appropriate service shop.

SUMMARY OF THE INVENTION

Generally speaking, one aspect of the present invention fulfills the foregoing needs by providing in one exemplary embodiment thereof a method for accommodating failed speed sensor in a locomotive. The method allows for providing predefined operational functions in the locomotive. The functions may be based on one or more speed sensor signals from a plurality of speed sensors in the locomotive. The method further allows for continuing to provide the operational functions even in the presence of faults in some of the speed sensors.

In another aspect thereof, the present invention further fulfills the foregoing needs by providing a computer-readable medium encoded with computer program code for accommodating failed speed sensors in a locomotive. The program code causes a computer to execute a method that allows for providing predefined operational functions in the locomotive. The functions may be based on one or more speed sensor signals from a plurality of speed sensors in the locomotive. The method further allows for continuing to provide the operational functions even in the presence of faults in some of the speed sensors, and for monitoring the respective health status of the plurality of speed sensors.

In yet another aspect of the present invention, the foregoing needs may be fulfilled by providing a processor configured to accommodate failed speed sensors in a locomotive so that predefined operational functions in the locomotive, based on one or more speed sensor signals from a plurality of speed sensors, continue uninterrupted even in the presence of faults in some of the speed sensors. The processor comprises a monitor module configured to monitor the respective health status of the plurality of speed sensors, and a control signal generator configured to generate a control signal based on the monitored speed sensor health status.

Figure 1:
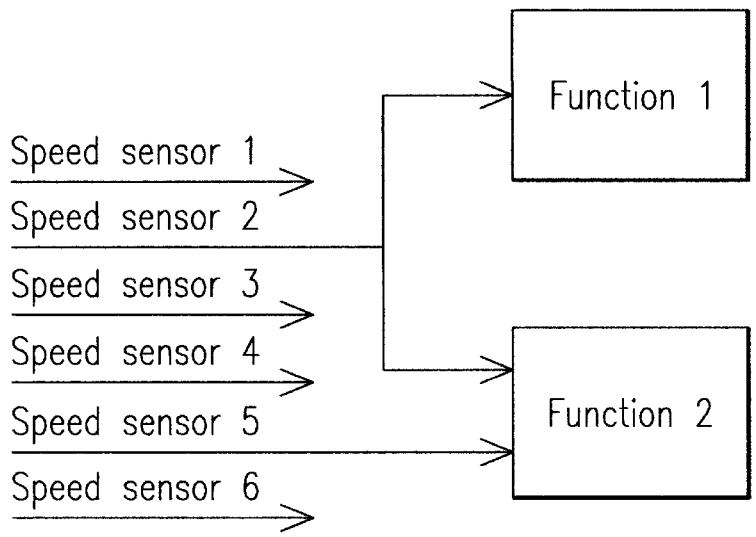
FIG. 1 shows a prior art technique for providing predefined operational functions based on respective speed sensor signals.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Figure 2:
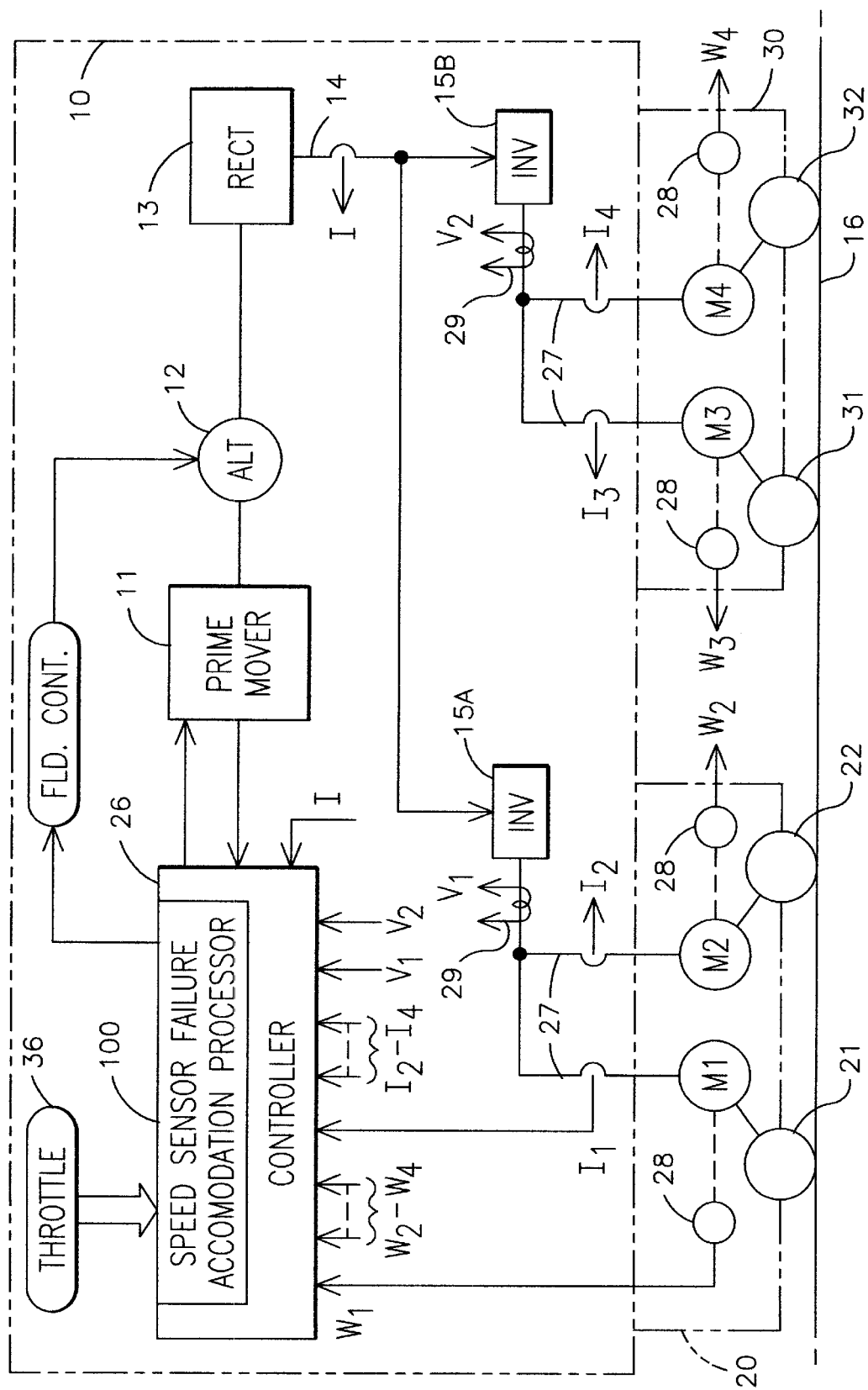
FIG. 2 shows an exemplary locomotive propulsion system including an exemplary processor for executing a method for accommodating speed sensor failures.

For purpose of illustration, the invention is described herein as it may be applied to a locomotive. The propulsion system 10 of FIG. 2 includes a variable speed prime mover 11 mechanically coupled to a rotor of a dynamo electric machine 12 comprising a 3-phase alternating current (AC) synchronous generator or alternator. The 3-phase voltages developed by alternator 12 are applied to AC input terminals of a conventional power rectifier bridge 13. The direct current (DC) output of bridge 13 is coupled via DC link 14 to a pair of controlled inverters 15A and 15B which inverts the DC power to AC power at a selectable variable frequency. The AC power is electrically coupled in energizing relationship to each of a plurality of adjustable speed AC traction motors M1 through M4. Prime mover 11, alternator 12, rectifier bridge 13 and inverters 15A, 15B are mounted on a platform of the traction vehicle 10, such as a four-axle diesel-electric locomotive. The platform is in turn supported on two trucks 20 and 30, the first truck 20 having two axle-wheel sets 21 and 22 and the second truck 30 having two axle-wheel sets 31 and 32.

Each of the traction motors M1–M4 is hung on a separate axle and its rotor is mechanically coupled, via conventional gearing, in driving relationship to the associated axle-wheel set. In the illustrative embodiment, the two motors M1 and M2 are electrically coupled in parallel with one another and receive power from inverter 15A while motors M3 and M4 are coupled to inverter 15B. However, in some instances, it may be desirable to provide an inverter for each motor or to couple additional motors to a single inverter. Suitable current transducers 27 and voltage transducers 29 are used to provide a family of current and voltage feedback signals, respectively, representative of the magnitudes of current and voltage in the motor stators. A plurality of speed sensors 28 are used to provide speed signals representative of the rotational speeds W1–W4 in revolutions per minute (RPM) of the motor shafts. These speed signals are readily converted to wheel speed in a well known manner. For simplicity, only single lines have been indicated for power flow although it will be apparent that the motors M1–M4 are typically three phase motors so that each power line represents three lines in such applications.

The magnitude of output voltage and current supplied to rectifier bridge 13 is determined by the magnitude of excitation current supplied to the field windings of the alternator 12. The excitation current is set in response to an operator demand (Throttle 36) for vehicle speed by the controller 26 which is in turn responsive to actual speed as represented by signals W1–W4. The controller 26 converts the speed command to a corresponding torque command for use in controlling the motors M1–M4. Since AC motor torque is proportional to rotor current and air gap flux, these quantities may be monitored or, more commonly, other quantities such as applied voltage, stator current and motor RPM may be used to reconstruct motor torque in controller 26. In an electrical braking or retarding mode of operation, inertia of the moving vehicle is converted into electrical energy by utilizing the traction motors as generators. Motor voltage and current are controlled to set a desired braking effort.

Controller 26 further includes a processor 100 configured to implement a method for accommodating speed sensor faults in the locomotive so that predefined operational functions in the locomotive, based on one or more speed sensor signals from speed sensors 28, are kept uninterrupted even in the presence of faults in some of the speed sensors.

Figure 3:
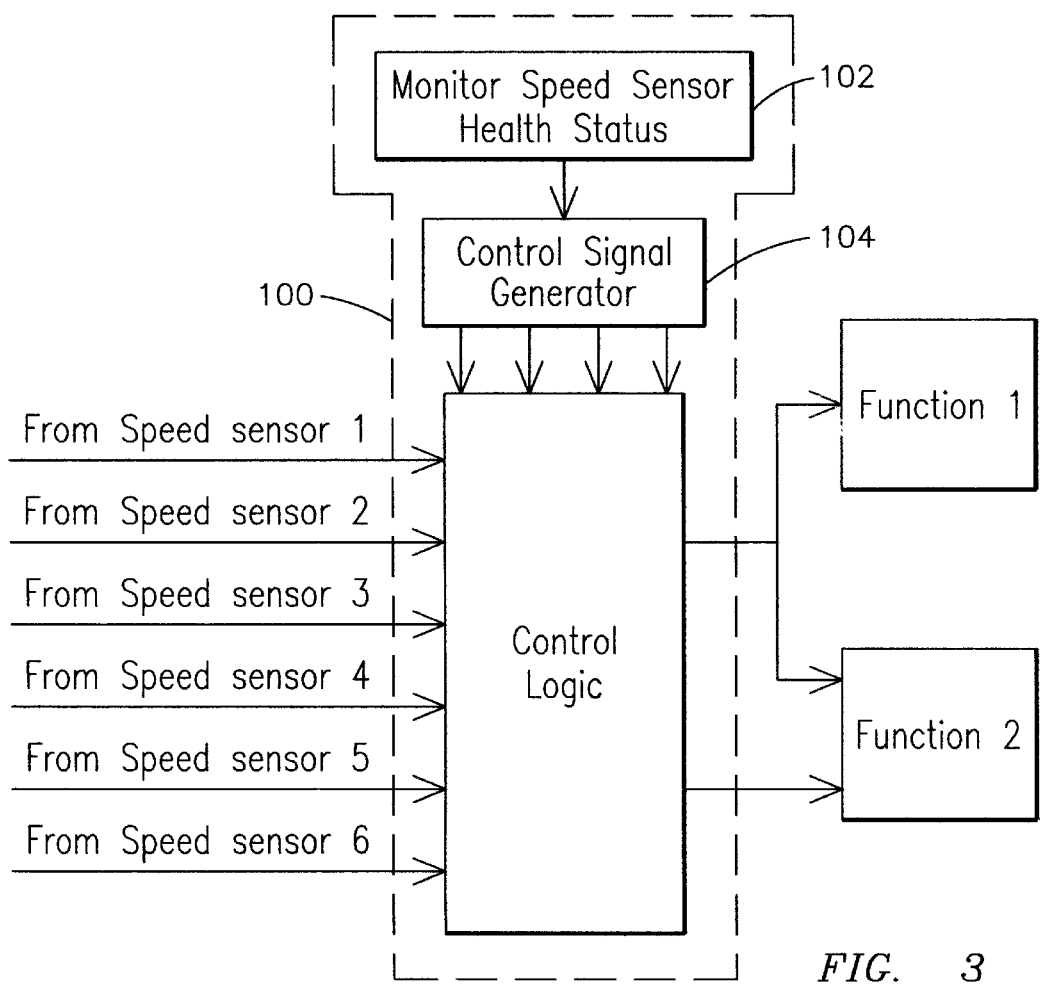
FIG. 3 shows further details regarding the processor of FIG. 2.

FIG. 3 illustrates further details in connection with processor 100 that allows for accommodating speed sensor faults in accordance with one aspect of the present invention. As suggested above, the same speed sensor input may be used for multiple functions. As further described below, processor 100 enables use of speed sensors which otherwise would not be used, as discussed in the context of FIG. 1. A monitor module 102 may be coupled to a suitable supervisory computer (not shown) which has information on the health of the speed sensors to monitor the respective health status of speed sensors 28. A control signal generator 104 is coupled to monitor 102 to generate a control signal, such as a binary encoded signal, based on the monitored speed sensor health status. The control signal may comprise a multi-bit signal and may be carried in parallel over multiple lines, each carrying a respective bit. It will be appreciated that the control signal need not be limited to a parallel construction being that the multi-bit signal could be serially transmitted using standard multiplexing techniques. In the event of multiple control lines, each control line could take a respective value corresponding to a logic one or logic zero. By way illustration and not of limitation, and assuming a six axle locomotive, where a respective operational function to be implemented may require a maximum of two independent speed sensor signals, then four control lines may be used. Depending on the control line value, speed sensor signals may be selected using standard combinational or control logic to provide a respective group of healthy speed sensors for enabling each of the operational functions. In one exemplary embodiment, the control logic may comprise a plurality of logic gates or circuits interconnected to implement a desired set of logic or Boolean operations as described below. As an example, a combinational logic table is given in Table 1 which is indicative of each group combination of speed sensors required to provide each operational function. In this example, if the control signal is 0000 then speed sensors 1 and 2 are selected to provide the respective two independent speed sensor signals needed to provide the respective Functions 1 and 2. Similarly, if the control signal is 0111, then speed sensor 2 and 5 would be selected as the two speed sensor signals for continuing to provide the respective Functions 1 and 2 in the event that speed sensor 1 were to develop a fault and respective speed sensors 2 and 5 have a respective healthy status, as determined by monitor 102. Conversely, if speed sensor 2 were to develop a fault, then control signal 0001 would allow for selecting respective speed sensors 1 and 3, once again assuming sensors 1 and 3 are determined to have a respective healthy status. In another aspect of the present invention, even if the various processor modules, e.g., monitor 102, generator 104, were to fail, the combinational logic can be selected to provide a fail-soft mode of operation so that respective signals from any two speed sensors would continue to be supplied, even in the event of a processor failure, such as may occur in the event malfunctions were to develop either in the monitor module, or in the control signal generator, or both. Thus, in such mode of operation, failure of the fault accommodation processor would not make the system any worse than the technique discussed in the context of FIG. 1. It will be appreciated that in the example of FIG. 3, processor 100 would permit continued operation of respective Functions 1 and 2 with up to four speed sensor failures.

It will be appreciated by those skilled in the art, that the techniques of the present invention can be adapted depending on the total number of speed sensors and the maximum number of speed sensor signals required to implement each operational function. In a general case, assuming n represents a positive integer indicative of the plurality of sensors, r presents another positive integer number less than n, and r represents the maximum number of speed sensors required to provide each operational function, then $C(n, r)$ would represent the number of group combinations of speed sensors selectable by the binary coded signal wherein: $C(n,r)=n!/((n-r)!*r!)$. Thus, in the above example, where n=6 and r=2, then $C(n,r)=15$. As suggested above, the fail soft mode of operation, may be represented in Table 1, by ensuring that if each control line bit is 1, then at least two arbitrary speed sensor signals would be selected, e.g., sensor signals 1 and 2.

In one exemplary embodiment, the present invention can be embodied in the form of a computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention.

The present invention can also be embodied in the form of computer program code, for example, whether stored in a storage medium, loaded into and/or executed by a computer, or transmitted over some transmission medium, such as over electric wiring or cabling, though fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The present invention can be embodied in the form of computer implemented processes and apparatuses for practicing those processes.

| Control Input | Speed Sensor Selection |
| --- | --- |
| 0000 | 1 2 |
| 0001 | 1 3 |
| 0010 | 1 4 |
| 0011 | 1 5 |
| 0100 | 1 6 |
| 0101 | 2 3 |
| 0110 | 2 4 |
| 0111 | 2 5 |
| 1000 | 2 6 |
| 1001 | 3 4 |
| 1010 | 3 5 |
| 1011 | 3 6 |
| 1100 | 4 5 |
| 1101 | 4 6 |
| 1110 | 5 6 |
| 1111 | 1 2 |

It will be understood that the specific embodiment of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A method for accommodating failed speed sensors in a locomotive, the method comprising:
providing predefined operational functions in the locomotive, said functions based on one or more speed sensor signals from a plurality of speed sensors in the locomotive;
continuing to provide said operational functions even in the presence of faults in some of the speed sensors.

2. The method of claim 1 further comprising monitoring the respective health status of the plurality of speed sensors.

3. The method of claim 2 further comprising generating a control signal based on the monitored speed sensor health status.

4. The method of claim 3 wherein the control signal comprises a binary coded signal.

5. The method of claim 4 wherein n represents a positive integer indicative of the plurality of sensors, r presents another positive integer number less than n, r being indicative of the maximum number of speed sensors required to provide each operational function, and C(n, r) represents the number of group combinations of speed sensors selectable by said binary coded signal wherein $C(n,r)=n!/((n-r)!*r!)$.

6. The method of claim 5 wherein the binary coded signal is configured to select a respective group combination of healthy speed sensors for enabling each of said operational functions.

7. The method of claim 6 wherein the binary coded signal is further configured to accommodate a fail soft mode of operation.

8. A computer-readable medium encoded with computer program code for accommodating failed speed sensors in a locomotive, the program code causing a computer to execute a method comprising:
providing predefined operational functions in the locomotive, said functions based on one or more speed sensor signals from a plurality of speed sensors in the locomotive;
continuing to provide said operational functions even in the presence of faults in some of the speed sensors; and
monitoring the respective health status of the plurality of speed sensors.

9. The computer-readable medium of claim 8 further comprising generating a control signal based on the monitored speed sensor health status.

10. The computer-readable medium of claim 9 wherein the control signal comprises a binary coded signal.

11. The computer-readable medium of claim 10 wherein n represents a positive integer indicative of the plurality of sensors, r presents another positive integer number less than n, r being indicative of the maximum number of speed sensors required to provide each operational function, and C(n, r) represents the number of group combinations of speed sensors selectable by said binary coded signal wherein $C(n,r)=n!/((n-r)!*r!)$.

12. The computer-readable medium of claim 11 wherein the binary coded signal is configured to select a respective group combination of healthy speed sensors for enabling each of said operational functions.

13. The computer-readable medium of claim 12 wherein the binary coded signal is further configured to accommodate a fail soft mode of operation for speed sensor selection.

14. A processor configured to accommodate failed speed sensors in a locomotive so that predefined operational functions in the locomotive, based on one or more speed sensor signals from a plurality of speed sensors, continue uninterrupted even in the presence of faults in some of the speed sensors, the processor comprising:
a monitor module configured to monitor the respective health status of the plurality of speed sensors; and
a control signal generator configured to generate a control signal based on the monitored speed sensor health status.

15. The processor of claim 14 wherein the control signal comprises a binary coded signal.

16. The processor of claim 15 wherein n represents a positive integer indicative of the plurality of sensors, r presents another positive integer number less than n, r being indicative of the maximum number of healthy speed sensors required to provide each operational function, and C(n, r) represents the number of group combinations of speed sensors selectable by said binary coded signal wherein $C(n,r)=n!/((n-r)!*r!)$.

17. The processor of claim 16 wherein the binary coded signal is configured to select a respective group combination of healthy speed sensors for enabling each of said operational functions.

18. The processor of claim 17 wherein the binary coded signal is further configured to accommodate a fail soft mode of operation for speed sensor selection.

* * * * *